(12) United States Patent
Shon et al.

(10) Patent No.: US 8,184,714 B2
(45) Date of Patent: May 22, 2012

(54) DIGITAL VIDEO CODEC USING SMALL-SIZED BUFFER MEMORY

(75) Inventors: Chang-Hwan Shon, Gyeonggi-do (KR); Hye-Kyung Kim, Seoul (KR); Hyun-Ryong Lee, Seoul (KR)

(73) Assignee: Core Logic, Inc., Seoul (KR)

( * ) Notice: Subject to any disclaimer, the term of this patent is extended or adjusted under 35 U.S.C. 154(b) by 1094 days.

(21) Appl. No.: 12/079,180

(22) Filed: Mar. 24, 2008

(65) Prior Publication Data

US 2008/0273598 A1   Nov. 6, 2008

(30) Foreign Application Priority Data

May 2, 2007   (KR) .................. 10-2007-0042683

(51) Int. Cl.
*H04N 7/12* (2006.01)
(52) U.S. Cl. .................................. 375/240.24
(58) Field of Classification Search .............. 375/240, 375/240.01, 240.24; 382/305
See application file for complete search history.

(56) References Cited

U.S. PATENT DOCUMENTS

| 5,768,445 | A * | 6/1998 | Troeller et al. | ............... 382/305 |
| 6,678,418 | B2 | 1/2004 | Chen | |
| 6,697,568 | B1 | 2/2004 | Kaku | |
| 7,925,120 | B2 * | 4/2011 | Lee | ............... 382/305 |
| 2006/0171685 | A1 | 8/2006 | Chen et al. | |
| 2008/0273598 | A1 | 11/2008 | Shon et al. | |

FOREIGN PATENT DOCUMENTS

| KR | 0015868 | 7/1993 |
| KR | 20010068232 | 7/2001 |
| KR | 1020060014605 | 2/2006 |
| KR | 100793286 | 1/2008 |
| WO | WO2008/136572 | 11/2008 |

OTHER PUBLICATIONS

International Search Report mailed Jun. 10, 2009 for PCT/KR/2008/001057 filed Feb. 22, 2008 and published as WO 2008/136572, 3 pages.
English Language Abstract for KR10_2006_0014605, 2 pages.
English Language Abstract for KR1993_0015868, 1 page.
English Language Abstract for KR2001_0068232, 2 pages.
Notice of Allowance for KR10_2007_0042683, 3 pages No translation.

* cited by examiner

*Primary Examiner* — Frank Duong
(74) *Attorney, Agent, or Firm* — The Nath Law Group; Joshua B. Goldberg; Robert T. Burns

(57) ABSTRACT

Techniques, systems and apparatus for digital information processing are described. In particular, techniques, systems and apparatus are described for reducing the size of buffer memory used. In one aspect, a digital video codec includes a buffer memory including an individual area to individually record different Minimum Coded Block (MCB) line data, and a common area to commonly record the different MCB line data. The codec also includes video encoder connected to the buffer memory to encode video data recorded in the individual area and the common area. Further, the codec includes a memory controller connected to the buffer memory to divisionally record a MCB line data in the individual area and the common area, and during encoding of the MCB line data, record another MCB line data in an encoding-completed area of the common area in a recording type corresponding to a memory structure of the encoding-completed common area.

40 Claims, 9 Drawing Sheets

DIGITAL VIDEO CODEC USING SMALL-SIZED BUFFER MEMORY

CLAIM OF PRIORITY

This application claims priority under 35 USC §119(a) to Korean Patent Application No. 10-2007-0042683, filed on May 2, 2007, in the Korean Intellectual Property Office, the entire contents of which are hereby incorporated by reference.

TECHNICAL FIELD

The present disclosure relates to digital video processing.

BACKGROUND

Digital information processing and apparatus for performing complex data processing can be implemented for various applications. For example, a digital image recording device such as a digital camera or a digital camcorder can digitize analog image data obtained from an image pickup device, such as CCD (Charge-Coupled Device) or CMOS (Complementary Metal-Oxide Semiconductor) device, and the digitized image data can be further processed for desired imaging applications. Such image data can be video data. The obtained analog video data may be converted into digital data that includes luminance data (Y) and chrominance data (Cb, Cr). The digital video recording device may also encode the digitized video data in units of minimum coded blocks (hereinafter referred to as MCB), each having N×N size using a video codec. The encoded video data can be stored in a recording medium.

SUMMARY

Techniques, systems and apparatus for digital information processing are described. In particular, techniques, systems and apparatus are described for reducing the size of buffer memory used.

In one aspect, a digital video codec includes a buffer memory including an individual area to individually record different Minimum Coded Block (MCB) line data, and a common area to commonly record the different MCB line data. The codec also includes video encoder connected to the buffer memory to encode video data recorded in the individual area and the common area. Further, the codec includes a memory controller connected to the buffer memory to divisionally record a MCB line data in the individual area and the common area, and during encoding of the MCB line data, record another MCB line data in an encoding-completed area of the common area in a recording type corresponding to a memory structure of the encoding-completed common area.

Implementations can optionally include one or more of the following features. The individual area can include a first area and a second area to independently record a line of the MCB line data. In addition, the memory controller can be configured to alternately select the first area and the common area to record the MCB line data and the second area and the common area to record the another MCB line data. Also, the buffer memory can be configured to record the MCB line data having a size including P×N bytes. Each of the first and second areas can have a memory size capacity to record a video data corresponding to one line of the MCB line data. In addition, the memory controller can be designed to record a first line of the MCB line data in the individual storage area and second to Nth lines of the MCB line data in the common storage area. In some implementations, N may include 8 bytes. The memory controller can be designed to record the MCB line data in the common storage area in a recording type corresponding to a reading type for encoding the video data recorded in the common storage area. Also, the MCB line data can be recorded in the common storage area using a linear type or a zigzag type. The memory controller is designed to alternately select the linear type and the zigzag type based on a line order of the MCB line data and records the MCB line data in the common area using the selected type.

Also, implementations can include one or more of the following features. The memory controller can be designed to select the zigzag type to record each line of the MCB line data by unit of memory block. When detecting that a number of MCBs processed in an encoding cycle is k, a horizontal size of the unit of memory block is selected as k multiplied by a horizontal size of the MCBs. The memory controller can be designed to alternately select to record the MCB line data in the buffer memory in a first recording type to enable any one line of the MCB line data to be recorded in the individual area, and other lines of the MCB line data to be recorded in the common area in a linear type; and record the another MCB line data in the buffer memory in a second recording type to enable any one line of the anther MCB line data to be recorded in the individual area and other lines of the another MCB line data to be recorded in the common area by unit of memory block in a zigzag type. The memory controller can be designed to record the MCB line data in an independently assigned memory area of the individual area. Also, the memory controller can be designed to record a first line of the MCB line data in the individual area, and the other lines of the MCB line data in the common area. The memory controller can be designed to record the MCB line data in the individual area arranged as a memory block using a zigzag type. When detected that the number of MCBs processed in an encoding cycle is k, a horizontal size of the memory block can be selected to be k times a horizontal size of the MCBs.

Further, implementations can include one or more of the following features. The video codec can include a first area and a second area. Each for the first and second areas can include a memory space to record a video data corresponding to one line of the MCB line data. When detected that the number of MCBs processed in an encoding cycle is k, the memory controller can be designed to record one line of next MCB line data in the second area during an initial encoding cycle of the MCB line data recorded in the first area and the common area, and record one line of the next MCB line data in the first area during an initial encoding cycle of the MCB line data recorded in the second area and the common area. The memory controller can be designed to divide the common area in memory blocks by a number of lines in the MCB line data, and individually records one line of the MCB line data in each memory block. When detecting that the number of MCBs processed in an encoding cycle is k, a horizontal size of the memory block can be selected as a product of k multiplied by a horizontal size of the MCBs. When detecting that the number of MCBs processed in an encoding cycle is k, during an nth encoding cycle (n>2, n is an integral number), the memory controller is configured to record an nth line (n>2, n is an integral number) of next MCB line data in the encoded common area in a recording type that is the same as a reading type for encoding.

Implementations can optionally include one or more of the following features. The memory controller can be designed to record the MCB line data and the another MCB line data in the common area by alternately using the linear type and the zigzag type based on a numerical order of the MCB line data and the another MCB line data. Also, the common area can include a supplementary memory space due to a difference of a recording type of the MCB line data and the another MCB line data. When detecting that a number of MCBs processed in an encoding cycle is k, the supplementary memory space is selected to include a memory space corresponding to a difference between a product of (a horizontal size of the MCBs multiplied by k multiplied by the number of lines of the MCB line data recorded in the common area) and a horizontal size of the MCB line data. The memory controller can be designed to change a recording start position and a recording progress direction of the MCB line data based on an angle of rotation of the video data, and record the first or second MCB line data in the individual area and the common area. The video encoder can be designed to change a reading start position and a reading progress direction of the video data for encoding based on an angle of rotation of the video data, and then encodes the video data.

Further, implementations can optionally include one or more of the following features. The codec can include a video decoder to receive an encoded video bit stream, decode the video bit stream by unit of MCB, downscale the decoded video bit stream by unit of block, and record the video bit stream in the buffer memory. When recording a video data corresponding to a capacity of the buffer memory, the memory controller can be designed to read the video data for playing the video data and accumulatively record the video data in a frame memory. The video decoder can be designed to downscale the decoded video data by unit of memory block to prevent a horizontal size of the video data to be played from exceeding a horizontal size of the buffer memory. The size of the MCB can include N×N bytes, and the video decoder can be designed to downscale the video data by unit of memory block having a size of $\{N \times (\frac{1}{2})^r\} \times \{N \times (\frac{1}{2})^r\}$ bytes with (r=1, 2, 3).

In another aspect, a method is described for controlling a digital video codec by encoding a video data using a buffer memory having an individual area where different MCB (Minimum Coded Block) line data are individually recorded and a common area where the different MCB line data are commonly recorded. The digital video codec can be controlled by (a) divisionally recording a MCB line data in the individual area and the common area. Also, (b) video data recorded in the individual area is combined with video data recorded in the common area by unit of memory block and the combined video data is encoded. In addition, (c) during encoding the video data, other MCB line data is recorded in an encoding-completed common area in a recording type corresponding to a memory structure of the encoding-completed common area.

Implementations can optionally include one or more of the following features. The individual area can be selected to include a first area and a second area to independently recording the different MCB line data. Also, a first combined area that includes the first area and the common area can be alternately selected with a second combined area that includes the second area and the common area in a numerical order of the MCB line data. Further, the MCB line data can be divisionally recorded in one of the alternately selected first and second combined areas. A size of the MCB line data can be selected to include P×N bytes. Also, each of the first and second areas can be selected to include a memory size capacity to record a video data corresponding to one line of the MCB line data. Further, a first line of the MCB line data can be recorded in the first area or the second area, and second to Nth lines of the MCB line data can be recorded in the common area. The MCB line data can be recorded in the common area in a recording type same as a common area reading type for encoding. A linear type and a zigzag type can be alternately selected in the numerical order of the MCB line data, and the MCB line data can be recorded in the common area. The zigzag type can be used to record each line of the MCB line data by unit of memory block. When detecting that the number of MCBs processed in an encoding cycle is k, a horizontal size of the unit of memory block can be selected to include a product of k multiplied by a horizontal size of the MCBs. Further, the MCB line data can be recorded in the individual area in the form of the unit of memory block by a zigzag type. When detecting that a number of MCBs processed in an encoding cycle is k, a horizontal size of the unit of memory block can be selected to include a product of k multiplied by a horizontal size of the MCBs.

In addition, implementations can optionally include one or more of the following features. The individual area can be selected to include a first area and a second area, with each of the first and second areas including a memory space capacity to record a video data corresponding to one line of the MCB line data. When detecting that a number of MCBs processed in an encoding cycle is k, one line of next MCB line data is recorded in the second area during an initial encoding cycle of the MCB line data recorded in the first area and the common area. Also, one line of next MCB line data is recorded in the first area during an initial encoding cycle of the MCB line data recorded in the second area and the common area. When the MCB line data is recorded in the common area, the common area can be divided in memory blocks by a number of lines to be recorded in the MCB line data, and one line of the MCB line data can be individually recorded in each of the memory blocks. When detected that a number of MCBs processed in an encoding cycle is k, a horizontal size of the memory block can be selected to include a product of k multiplied by a horizontal size of the MCBs. When detecting that a number of MCBs processed in an encoding cycle is k, during an nth encoding cycle (n>2, n is an integral number), an nth line (n>2, n is an integral number) of next MCB line data can be recorded in the encoding-completed common area in a recording type same as a reading type used for encoding.

Further, implementations can optionally include one or more of the following features. A recording start position and a recording progress direction of the MCB line data can be changed based on an angle of rotation of the video data. Also, the MCB line data can be recorded in the individual area and the common area. Further, a reading start position and a reading progress direction of the video data for encoding can be changed based on an angle of rotation of the video data, and the video data can be encoded. In addition, controlling the video codec can include (d) receiving an encoded video bit stream, decoding the video bit stream by unit of MCB, downscaling the decoded video bit stream by unit of memory block, and recording the video bit stream in the buffer memory. Further, controlling the video codec can include (e) when a video data corresponding to a capacity of the buffer memory is recorded in the buffer memory, reading the video data for playing the video data and accumulatively recording the video data in a frame memory. The decoded video data can be downscaled by unit of memory block so that a horizontal size of the video data to be played does not exceed a horizontal size of the buffer memory. A size of the MCB can be selected to include N×N bytes, and the decoded video data can be downscaled by unit of memory block having a size of $\{N \times (\frac{1}{2})^r\} \times \{N \times (\frac{1}{2})^r\}$ with (r=1, 2, 3).

The techniques based on the present specification possibly can provide one or more of the following advantages. For example, systems, techniques and a digital video codec can be implemented to improve an encoding efficiency and reduce usage size of a buffer memory in encoding video data. In addition, the systems, techniques and a digital video codec according to the subject matter described in this specification can be implemented to enable decoding of the encoded video data using a buffer memory having reduced capacity. Further, the systems, techniques and a digital video codec according to the subject matter described in this specification can be implemented to enable playback of video data having a size larger than a capacity of a frame memory using the buffer memory having reduced capacity.

Also, the subject matter of the present specification can be implemented to possibly provide one or more of the following advantages. A digital video encoder according to the present specification can be implemented to use a dual buffer memory and yet reduce the usage size of a buffer memory compared to the conventional encoding techniques. Therefore, the subject matter according to the present specification can be implemented to reduce the production cost of a video codec chip and reduce the chip size. In addition, the scalar for downscaling the decoded video data in block units can be included in the video decoder, and thus enable playback of video data of high resolution above a capacity of the frame memory.

BRIEF DESCRIPTION OF THE DRAWINGS

Like reference symbols and designations in the various drawings indicate like elements.

DETAILED DESCRIPTION

Figure 1:
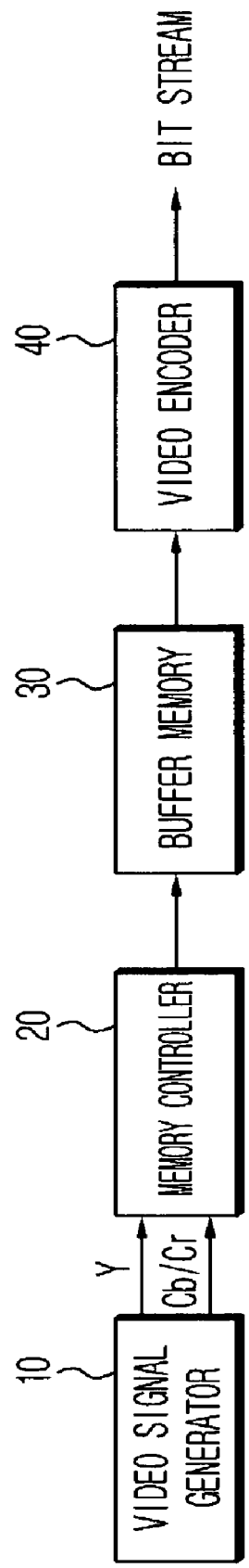
FIG. 1 is a block diagram illustrating an example configuration of a digital video codec.

Various techniques, systems, video codec and computer program products are described for efficiently performing data intensive operations in video data processing. In particular, efficient video data processing is described for using dual buffer memory and reduced frame buffer capacity.

Digitized video data can be encoded by storing (or recording) the video data having P×N size in a buffer memory referred to by a video codec. For the P×N size, P represents a horizontal size of the video data and N represents a size of the MCB. For example, a sample video data of 1,024×768 (P×N) size may be encoded according to Joint Photographic Experts Group (JPEG) standard. Because the JPEG encoding of the sample video data is performed in 8×8 block units, video data of at least 1,024×8 size may be recorded in the buffer memory.

However, when a buffer memory having a size corresponding to a capacity of MCB line data is used in encoding video data, the encoding process is not executed until the MCB line data is recorded in the buffer memory. Also, additional MCB line data is not loaded in the buffer memory during the encoding process, which increases the encoding time and thus reduces the encoding efficiency. Note that MCB line data refers to video data of N line corresponding to a vertical size of the MCB among the entire video data.

In an encoding technique using a dual buffer memory, the current MCB line data is loaded in one buffer memory of the dual buffer memory, and the next MCB line data is loaded in the other buffer memory. Thus, the dual buffer memory enables near immediate encoding of the MCB line data in the two buffer memories in continuous manner.

Encoding the video data using the dual buffer memory may improve encoding efficiency. The dual buffer memory used may be implemented use a buffer memory having a larger memory capacity than a single buffer memory. Such larger buffer memory may increase the unit cost of a video codec for encoding- and decoding video data in a digital image pickup device and increasing the size of the codec chip.

The use of a dual buffer memory may also require a frame memory for recording the decoded video data and to play the encoded video data on a display. The frame memory may have a memory capacity corresponding to at least the size of the encoded video data. For example, when the encoded video data has a size of 1,024×768 and a sampling mode of 4:2:2, the frame memory may be selected to have a memory capacity of at least 1,572,864 bytes ([1,024×768×]×2). When detected that the size of the encoded video data exceeds the frame memory capacity, a portion of the video data may be cut off during playing of the video data. Therefore, the size of the video data to be decoded by a digital image pickup device may be limited by the frame memory capacity.

Such frame memory capacity limitation may not be an issue for a stand alone image capture device, such as a digital camera/camcorder. Because a video camera may be mainly designed to play self-recorded video data, a mismatch between the video data size encoded and the capacity of a frame memory (the size of video data encoded being larger than the capacity of a frame memory) tend not to exist. However, such mismatch may occur for a digital image capture device integrated into a handheld device, such as a mobile phone, a smart phone, a Personal Digital Assistant (PDA) or a personal multimedia device.

For example, video data received from a third party may be larger than the available capacity of the frame buffer. Such 3rd party video data may be obtained by downloading from a server through a wireless network, receiving through a multimedia messaging service or transferring from a personal computer to the handheld terminal. In such instances, the image capture device integrated into a handheld device may have a difficulty in decoding and playing the 3rd party video data having a size over a capacity of the frame memory of the handheld terminal.

To remedy such memory mismatch issue, a frame memory having high memory capacity may be implemented for the handheld device having the integrated image capture device. However, the ability to increase the memory capacity of the frame memory may be limited due to the small internal space of the handheld device. The increased capacity of the frame memory tends to make miniaturization of the handheld device difficult.

To avoid increasing the size of the handheld device, conventional techniques may require having the vide data scaled down to conform to the memory capacity of the frame memory using a data editing program. The scaling of the video data tends to be performed before the handheld device receives that data. The scaled down version of the video data can be sent as an input to the handheld terminal to be played.

Example techniques and systems for implementing and controlling a digital video codec to improve an encoding efficiency and reduce usage size of a buffer memory in encoding video data are described in this specification.

FIG. 1 is a block diagram illustrating an example configuration of an apparatus (e.g., a digital video codec) for efficient processing of video data. The digital video codec according to the present specification includes a video signal generator 10, a memory controller 20, a buffer memory 30 and a video encoder 40. The video signal generator 10 can be designed to generate and output digital video data. The memory controller 20 is connected to the video signal generator 10 and the buffer memory 30 to receive the digital video data from the video signal generator 10 and record (or store or save) the received digital video data in the buffer memory 30. The video encoder 40 is connected to the buffer memory to encode the stored digital video data in the buffer memory 30 to generate a bit stream.

The video signal generator 10 outputs digital video data that includes luminance data (Y) and chrominance data (Cb, Cr) for each pixel of the output video data. The video signal generator 10 can be implemented to include various other components (not shown). For example, the video signal generator 10 can include an image capturing device, such as an image sensor based on a charge-coupled device (CCD) or a complementary metal-oxide-semiconductor (CMOS), sample-holding circuitry, automatic gain control circuitry, analog-to-digital (A/D) converting circuitry, and Digital Signal Processing (DSP) circuitry.

The CCD or CMOS based image capturing device receives the video signal output and generates a video signal output. The sample-holding circuitry removes any unnecessary signal components from the generated video signal output obtained from the image capturing device. The automatic gain control circuitry can control and maintain the bandwidth of the analog video signal output obtained from the sample-hold circuitry. The A/D converting circuitry can convert the analog video signal to a digital signal. The gain of the converted signal is controlled to produce a digital video signal. The DSP circuitry ca be used to convert the digital video signal into luminance data (Y) and chrominance data (Cb, Cr) according to a predetermined sampling mode (for example, 4:2:2 mode) and output the converted data.

In some implementations, the configuration of the video signal generator 10 is varied and/or modified. For example, a choice between the CCD and CMOS image sensors can be made. In addition, not all of the components described need to be implemented. Thus, the video signal generator the present invention is not limited to any one configuration of the video signal generator 10. Further, the video signal generation 10 is not limited to the described CCD and CMOS image sensors, and other appropriate image capture devices for outputting a digital video data can be implemented.

The memory controller 20 receives the digital video data output from the video signal generator 10 and records the received digital video data in the buffer memory 30. The memory controller 20 records odd MCB line data and even MCB line data in different recording types (e.g., linear, zig-zag, etc.)

The vertical size of the received video data is divided by the vertical size of MCB, and each MCB line located at an odd order (or location) is identified as an odd MCB line. Conversely, each MCB line located at an even order (or location) is identified as an even MCB line.

Figure 2:
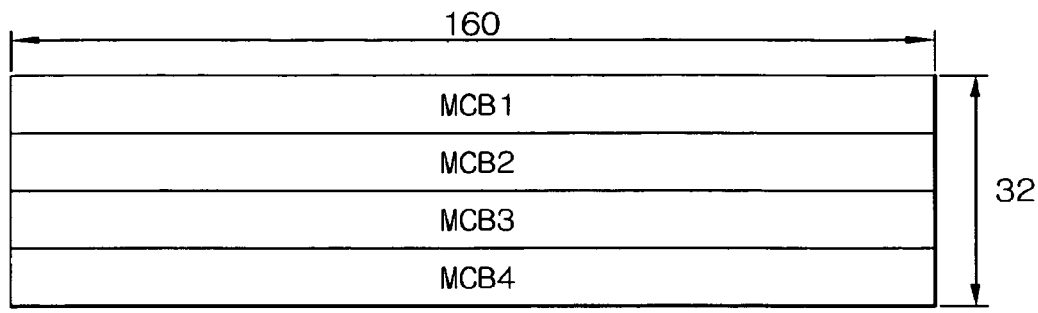
FIG. 2 is a view illustrating an example concept of odd MCB line and even MCB line.

FIG. 2 is a diagram illustrating an example of odd MCB lines and even MCB lines. In this example, the MCB is detected as having an 8×8 byte size and the video data is detected as having an 160×32 byte size. The detected 8×8 MCB can enable the video data having 160×32 byte size to be divided into four MCB lines. From the four MCB lines, MCB1 and MCB3 are identified as odd MCB lines, and MCB2 and MCB4 are identified as even MCB lines.

The buffer memory 30 can be implemented to have several divided areas for recording, storing or saving the even and odd MCB line data in two different recording types.

Figure 3:
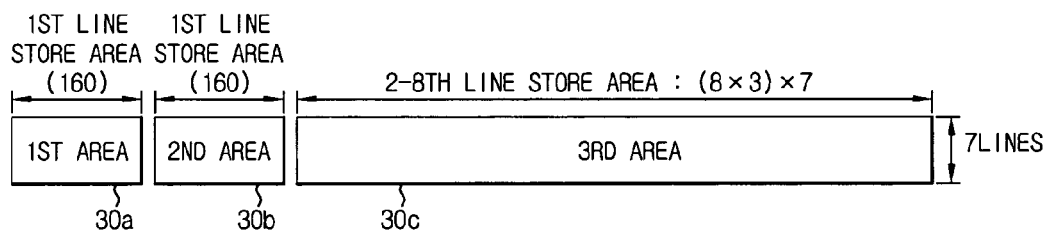
FIG. 3 is a memory structure diagram illustrating a physical division structure of a buffer memory.

FIG. 3 is an example memory structure diagram illustrating an example division structure of the buffer memory 30. In the example shown in FIG. 3, the buffer memory 30 includes three physically divided areas 30a, 30b and 30c for recording the MCB line data in two different recording types.

The example buffer memory 30 of FIG. 3 has a memory structure used when a video data of 160×32 size is encoded by a MCB of 8×8 size. However, the subject matter according to the present specification is not limited to a specific size of video data or MCB. In some implementations, video data and MCB of other sizes are used. For illustrative purposes, among others, the time needed to save, store or record pixel data for a single line of video data, received from the video signal generator 10, in the buffer memory 30 is represented to be three times the time needed to encode the MCB in the video encoder 40. In other words, during the time needed to record the pixel data of the single line in the buffer memory 30, three MCBs can be encoded by the video encoder 40.

The example buffer memory 30 shown in FIG. 3 has a first area 30a, a second area 30b and a third area 30c. The first area 30a can be used to record the first line of odd MCB line data. The first area 30a has a memory space capacity to record pixel data (e.g., 160 pixels) of a single line of video data. The second area 30b can be used to record the first line of even MCB line data. The second area 30b has a memory space capacity to record pixel data (e.g., 160 pixels) of one line of video data. The first area 30a and the second area 30b are individual and separate memory spaces for recording first lines of odd MCB line data and even MCB line data, respectively.

The third area 30c can be used to save, store or record second to $N^{th}$ (e.g., eighth) lines of odd MCB line data and even MCB line data. The third area 30c has a memory space capacity to record pixel data for the second to eighth lines of even and odd video data. Further, the third area 30c can include a supplementary memory space (not shown).

The supplementary memory space is a memory space designed to correspond or match the speed of recording the video data from the video signal generator 10 in the buffer memory 30 with the speed of encoding the video data saved/stored/recorded in the buffer memory 30 by the video encoder 40. The supplementary memory is further described below.

When recording the pixel data for the second to $N^{th}$ (e.g., eighth for the example shown) lines of MCB line data in the third area 30c, the memory controller 20 records the odd MCB line data as a linear type. The even MCB line data are recorded as a zigzag type. Thus, the third area 30c operates as a common memory space that enables both video data recording in linear type and video data recording by unit of block in zigzag type.

Techniques as described in the present specification can be realized in various implementations to reduce the use of the buffer memory 30. For example, a digital video codec implemented using the techniques as described in this specification can include a buffer memory 30 that includes an individual area 30a and 30b to individually record different Minimum Coded Block (MCB) line data. The buffer memory can also include a common area 30c to commonly record the different MCB line data. The digital video codec can include a video encoder 40 connected to the buffer memory 30 to encode video data recorded in the individual area 30a, 30b and the common area 30c. Also, the digital video codec can include a memory controller 20 connected to the buffer memory 30 to divisionally record a MCB line data in the individual area 30a or 30b and the common area 30c. During encoding of the MCB line data, the memory controller 20 can record another MCB line data in an encoding-completed area of the common area 30c in a recording type corresponding to a memory structure of the encoding-completed common area.

In another example, an apparatus for encoding digital video data can be implemented to include a buffer memory 30 separated in at least three recordable areas 30a, 30b and 30c. The buffer memory 30 can include a first area 30a to record video data organized in even Minimum Coded Block (MCB) line data; a second area 30b to record the video data organized in odd MCB line data; and a third area 30c to record the video data organized in both even and odd MCB line data. The apparatus can include a video encoder 40 connected to the buffer memory 30 to receive and encode the video data recorded in the first 30a, second 30b and third 30c areas. Also, a memory controller 20 can be connected to the buffer memory 30 to divisionally record the video data in either (1) the first 30a and third 30c areas or (2) the second 30b and third 30c areas. During encoding of the video data recorded in the first 30a, second 30b or third 30c areas, the memory controller 20 can record another video data arranged in odd or even MCB line data in an encoding-completed area of the third area 30c in a recording type corresponding to a memory structure of the encoding-completed common area. These and other implementations are described with respect to FIGS. 4-21.

Figure 4:
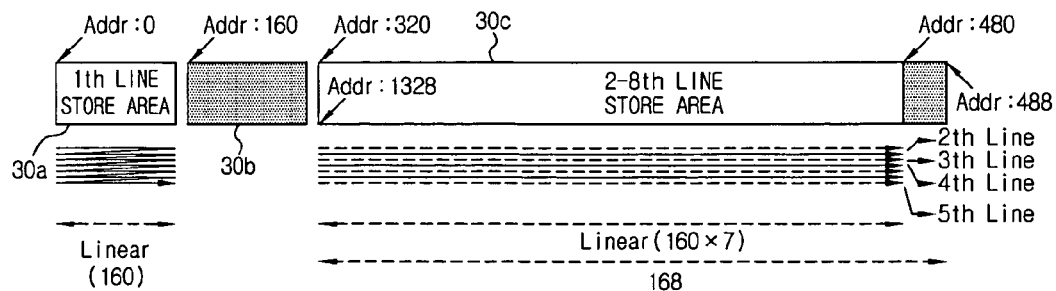
FIG. 4 is a diagram illustrating an example type for recording odd MCB line data in a buffer memory.

FIG. 4 is a diagram showing an example for recording the odd MCB line data in the buffer memory 30. When the odd MCB line data is recorded in the buffer memory 30, the pixel data for the first line is recorded in the first area 30a. The first area 30a has a memory space capacity corresponding to 160 pixel data. The pixel data for the second to eighth lines for the odd MCB is recorded in the third area 30c in a linear type. The pixel data for the second to eighth lines of the odd MCB is recorded on different line addresses of the buffer memory 30. In the example shown in FIG. 4, a horizontal size of the third area 30c for recording the pixel data of the second to eighth lines of the odd MCB is 160. The total recordable memory size of the third area 30c is 1120 (160×7=1120). For reference, size 1 (each memory unit) of the memory space corresponds to a memory space capable of recording 1 pixel data.

Figure 5:
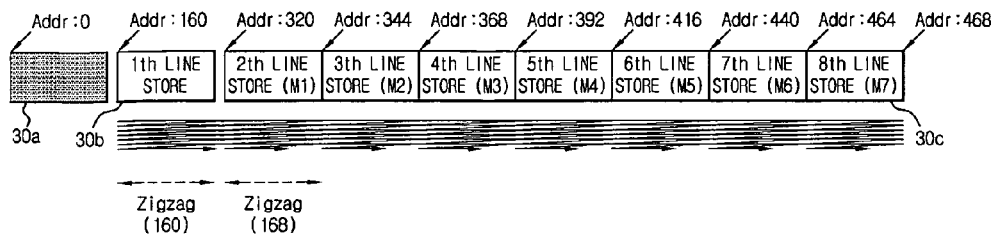
FIG. 5 is a diagram illustrating an example type for recoding even MCB line data in a buffer memory.

FIG. 5 is a diagram of an example for recoding the even MCB line data in the buffer memory 30. When the even MCB line data is recorded, the pixel data for the first line is recorded in the second area 30b. The second area 30b has a memory space capacity corresponding to 160 pixel data. The pixel data for the second to $n^{th}$ (e.g., eighth in the example shown) lines are recorded in the third area 30c as zigzag type. In this instance, the third area 30c is divided in first to $N^{th}$ (seventh in the example shown) memory blocks (M1 to M7). A horizontal size of the third area 30c is 168 (8×3×7=168). The horizontal size of each memory block is 24 (8×3=24). The total recordable memory size of the third area 30c is 1,176 (168×7=1,176). Because each of the memory block has a size of 168 (8×3×7=168), all of the pixel data (160 pixels) for each line is recorded in each of the memory blocks.

The horizontal size of the third area 30c is determined or designed to enable recording of both odd MCB line data and even MCB line data. In particular, the horizontal size of the third area 30c can be at least the same as or larger than a size required to record both odd MCB line data and even MCB line data. For the example shown, the horizontal size of the third area 30c is 160 for recording even MCB line data, and the horizontal size of the third area 30c is 168 for recording odd MCB line data. Thus, the horizontal size of the third area 30c is selected to be 168 or more to enable recording of the second to eighth lines of MCB line data.

For the example shown, a memory space capacity that enables recording of 1,120 pixel data is used to record odd MCB line data in the third area 30c, and a memory space capacity that enables recording 1,176 pixel data is used to record even MCB line data in the third area 30c. As such, different memory spaces are used to record even and odd MCB line data. The difference in memory spaces used can be based on to a difference between a speed of recording video data in the buffer memory 30 by the memory controller 20 and a speed of encoding the video data recorded in the buffer memory 30 by the video encoder 40. This difference in the memory space used to record odd MCB line data and even MCB line data in the third area 30c can be defined as the supplementary memory space. In the example shown, the size of the supplementary memory space is 56 (1,176−1,120=56).

As the supplementary memory space increases, the size of the buffer memory 30 increases. To minimize the size of the supplementary memory space, a digital video codec is designed to control the processing speed of the video encoder 40 and the processing speed of the memory controller 20 to remain within a set range. An example allowable range is shown in the following conditional expression 1.

$$N \times k \times C \geq \text{a horizontal size of a video data} \quad \text{[Conditional Expression 1]}$$

where N is a horizontal size of MCB, k is the number of MCBs encoded by the video encoder 40 while one line of MCB line data is recorded in the buffer memory 30, and C is the number of lines of MCB line data recorded in the third area 30c.

When a parameter satisfying the conditional expression 1 is selected, the supplementary memory space is calculated using the following equation 1.

$$\text{Supplementary memory space}=(N \times k \times C - \text{a horizontal size of a video}) \times 7 \quad \text{[Equation 1]}$$

Figure 6:
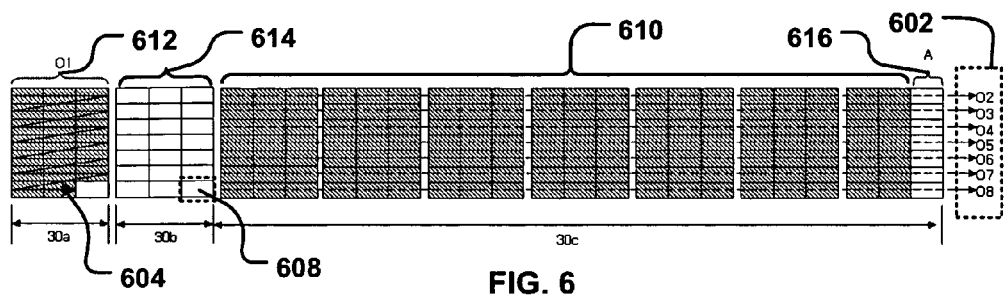
FIGS. 6 to 14 are diagrams sequentially illustrating an example process for encoding video data using a buffer memory.

FIGS. 6 to 14 sequentially illustrate an example process for encoding the video data using the buffer memory 30 having the above-described structure. FIG. 6 illustrates an example of a state of the buffer memory 30 immediately after the memory controller 20 records a first MCB line data (O1~O8) in the buffer memory 30. A first line (O1) of the first MCB line data is recorded in a zigzag type and second to eighth lines (O2~O8) of the first MCB line data are recorded in a linear type. In FIG. 6, each arrow 602 and 604 indicates a video data recording method and each grid 608 represents a memory space corresponding to a horizontal size of MCB. The linear recording method type is indicated using arrow 602 and the zigzag recording method type is indicated using arrow 604. Thus, each grid has 8×1 size and a memory space capable of recording 8 pixel data. A grid with the recorded video data is marked using hatched symbols 610, 612. A grid without the recorded video data is not marked with hatched symbols 614, 616. The supplementary memory space is marked as section "A" 616.

After the first MCB line data (O1~O8) is completely recorded, the video encoder 40 performs encoding by unit of MCB to generate and output an encoded video bit stream. In parallel with encoding, the memory controller 20 continuously receives a digital video data output from the video signal generator 10 and records the digital video data in the buffer memory 30. As described above, it may be assumed that while one line of the video data is recorded, three MCBs are encoded by the video encoder 40. The process of encoding three MCBs during recording of one line of video data can be designated as an encoding cycle.

Figure 7:
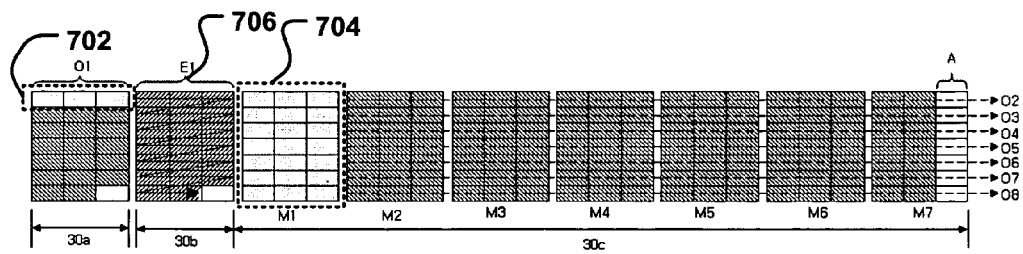

In FIG. 7, the video encoder 40 operates to combine the video data (O1 of M1) recorded in the first area 30*a* with the video data (O2~O8 of M1) recorded in the third area 30*c*. This combination operation enables the formation of the MCB and encoding of the video data. In FIG. 7, the encoded video data is expressed as shaded grids 702, 704. When MCB is formed, the first line is obtained from the first area 30*a* and the second to eighth lines are obtained from a first memory block (M1) of the third area 30*c*. Each MCB is formed by the following Equation 2.

$$\text{The first } MCB = (1, p)_{30a} + \sum_{k=1}^{7} (1, k)_{Mp} \text{ (where } p = 1) \quad \text{[Equation 2]}$$

$$\text{The second } MCB = (2, p)_{30a} + \sum_{k=1}^{7} (2, k)_{Mp} \text{ (where } p = 1)$$

$$\text{The third } MCB = (3, p)_{30a} + \sum_{k=1}^{7} (3, k)_{Mp} \text{ (where } p = 1)$$

In the above Equation 2, a grid constituting the MCB is expressed as coordinates. An x value represents an x coordinate of a grid based on left of a memory block, a y value represents a y coordinate of a grid based on top of a memory block, and a subscript represents a memory block, to which a grid belongs.

While encoding three MCBs, the memory controller 20 records pixel data of a first line (E1) 706 of a second MCB line data in the second area 30*b*. For reference, a grid of the second MCB line data is expressed in a different hatching shape from the grid of the first MCB line data.

Figure 8:
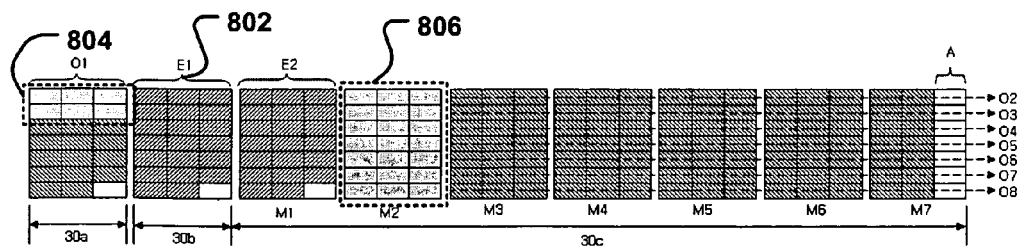

Referring to FIG. 8, after the first memory block (M1) is encoded and the video data (E1) 802 is recorded in the second area 30*b*, the video encoder 40 combines the video data 804 included in the first area 30*a* and the video data 806 recorded in a second memory block (M2) to form the MCB and performs encoding. Each MCB may be formed by the above-mentioned equation 2 (p=2). In parallel with this process, the memory controller 20 records pixel data of a second line (E2) of the second MCB line data in the encoding-completed first memory block (M1) in a zigzag type.

Figure 9:
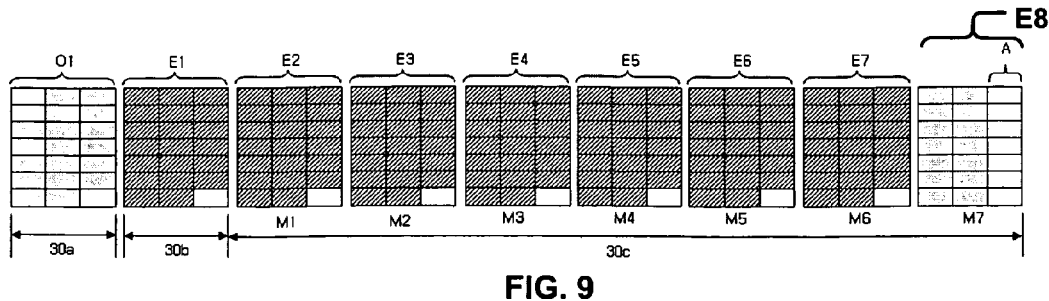
Figure 10:
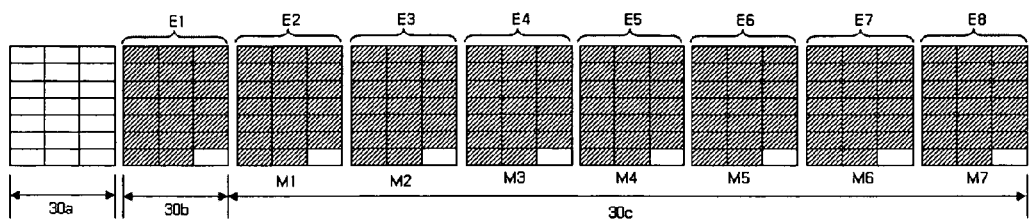

FIG. 9 illustrates an example of a structure of the buffer memory 30 with a seventh memory block (M7) being encoded. The first MCB line data is completely encoded, and pixel data of the first to seventh lines (E1~E7) of the second MCB line data is recorded in the second area 30*b* and the first to sixth memory blocks (M1~M6) in a zigzag type. In this state, the video encoder 40 temporarily stops encoding of the video data. The memory controller 20 records the pixel data of an eighth line (E8) of the second MCB line data in a seventh memory block (M7). The memory controller 20 selectively deletes the video data recorded in the first area 30*a*. After this process is completed, as shown in FIG. 10, the second MCB line data is prepared for encoding, and thus the second MCB line data is encoded immediately.

Figure 11:
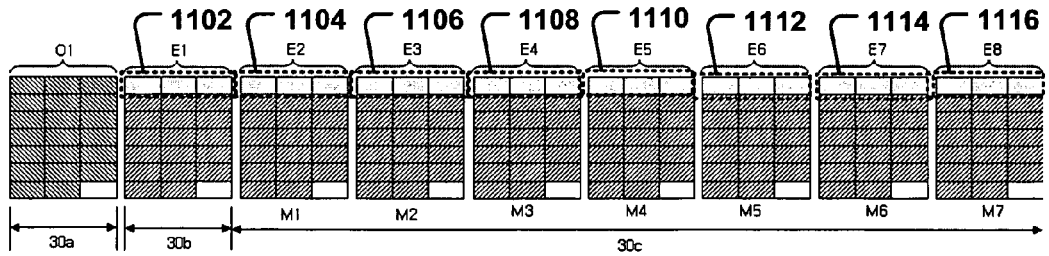

Under this design, as shown in FIG. 11, the video encoder 40 combines the video data (E1) 1102 of the second area 30*b* and the video data (E2~E8) 1104, 1106, 1108, 1110, 1112, 1114 and 1116 of the first to seventh memory blocks (M1~M7) to form MCB, and performs encoding. At this time, a first line is obtained from the second area 30*b* and the second to eighth lines are obtained from the first to seventh memory blocks (M1 to M7), respectively. Each MCB is formed by the following equation 3.

$$\text{The first } MCB = (1, p)_{30b} + \sum_{k=1}^{7} (1, p)_{Mk} \text{ (where } p = 1) \quad \text{[Equation 2]}$$

$$\text{The second } MCB = (2, p)_{30b} + \sum_{k=1}^{7} (2, p)_{Mk} \text{ (where } p = 1)$$

$$\text{The third } MCB = (3, p)_{30b} + \sum_{k=1}^{7} (3, p)_{Mk} \text{ (where } p = 1)$$

In the above equation 3, a grid of MCB is expressed as coordinates, an x value represents an x coordinate of a grid based on left of a memory block, a y value represents a y coordinate of a grid based on top of a memory block, and a subscript represents a memory block, to which a grid belongs.

After three MCBs are encoded, the video data of a first line of the third area 30*c* is completely encoded. Meanwhile, while encoding the three MCBs, the memory controller 20 records the pixel data of a first line (O1) of a third MCB line data in the first area 30*a*.

Figure 12:
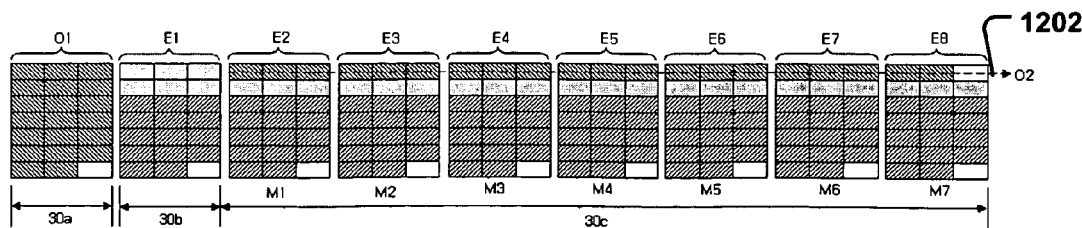

After the first line of the third area 30*c* is encoded and the video data (O1) of the first area 30*a* is recorded (linear type shown), as shown in FIG. 12, the video data recorded in a second line of the third area 30*a* is encoded. At this time, each MCB may be formed by the above equation 3 (p=2). Simultaneously, pixel data of the second line (O2) 1202 of the third MCB line data is recorded in the first line of the encoding-completed third area 30*c* in a linear type.

Figure 13:
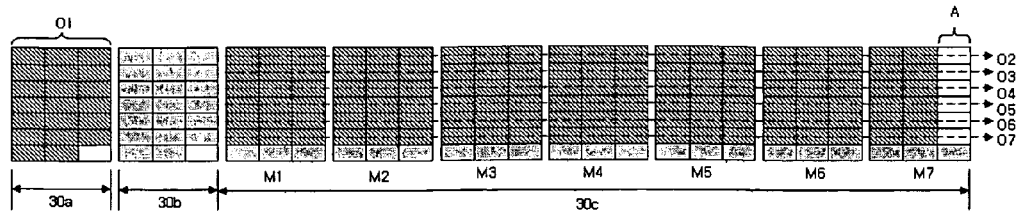
Figure 14:
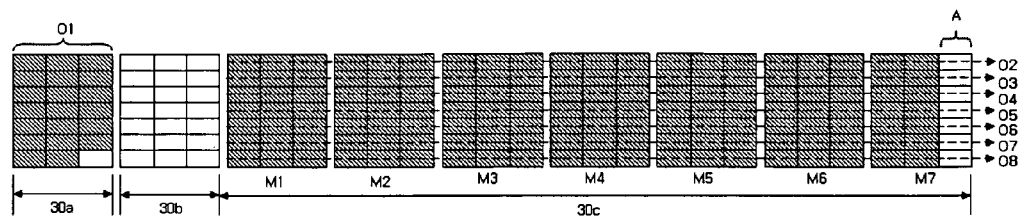

FIG. 13 illustrates an example of a structure of the buffer memory 30 after encoding the video data recorded in the third to seventh lines of the third area 30*c*. The second MCB line data is completely encoded, and the first line (O1) of the third MCB line data is recorded in the first area 30*a* in a zigzag type, and the second to seventh lines (O2~O7) of the third MCB line data are recorded in the first to sixth lines of the third area 30*c* in a linear type. In this state, as shown in FIG. 14, the video encoder 40 temporarily stops encoding of the video data and the memory controller 20 records the pixel data of the eighth line (O8) of the third MCB line data in the seventh line of the third area 30*c*. The memory controller 20 may selectively delete the video data of the second area 30*b*. After this process is completed, the third MCB line data is prepared for encoding, and thus the third MCB line data is immediately encoded.

A subsequent video data encoding process, which includes recording of the fourth MCB line data and encoding of the third MCB line data being performed at the same time, is performed by repetition of the above-mentioned process.

The bit stream output generated by the video encoder 40, using the encoding process according to the present specification, is recorded in a stream buffer. The bit stream output is generated in a file by a file driver and recorded in a recording medium (for example, a flash memory or a hard drive). Any of the well-known techniques for generating the bit stream in a file can be used.

In some implementations, the number of lines for the MCB line data recorded in the first area 30*a* and the second area 30*b* can be increased (to two or more, for example). In such instances, the number of lines of the MCB line data recorded in the third area 30*c* is reduced accordingly. The encoding principle for the first 30*a*, second 30*b* and third areas 30*c* can remain substantially the same as described above. For example, video data of the first area 30*a* and the third area 30*c* or video data of the second area 30*b* and the third area 30*c* are combined and encoded by a unit of MCB. Simultaneous to the encoding, the next MCB line data is recorded beforehand in the encoding-completed memory space in a video data recording type (linear or zigzag) corresponding to a structure of the encoding-completed memory space.

In some implementations, the above-described encoding process according to the present specification may be applied to a rotation encoding process. In the rotation encoding process, the digital video data input from the video signal generator 10 is encoded by rotating in a predetermined direction.

Figure 15:
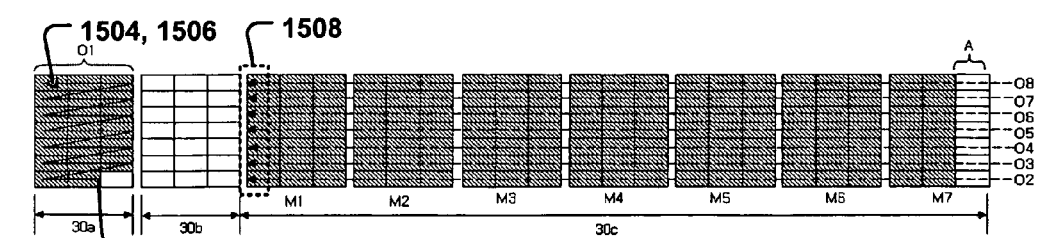
FIG. 15 is a diagram illustrating an example type for recording odd MCB line data in a buffer memory using a 180 rotation encoding process.

FIG. 15 is a diagram illustrating an example for recording the odd MCB line data in the buffer memory 30 using a 180 degree rotation encoding process. The video data of the first line (O1) of odd MCB line data is recorded in the first area 30*a*, in a zigzag type in the direction of an arrow 1504 from the right side 1502 of the bottom to the left side of the top 1506. The video data of the second to eighth (O2~O8) lines of the odd MCB line data are recorded in the third area 30*c* in a linear type, in the direction of an arrow 1508 from the bottom of the third area 30*c*. At this time, a video data recording direction is directed from right to left as indicated by the arrow 1508.

Figure 16:
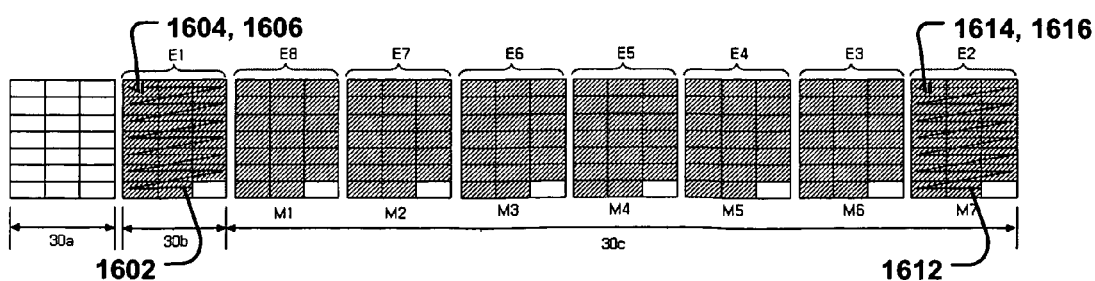
FIG. 16 is a diagram of an example type for recording even MCB line data in a buffer memory using a 180 rotation encoding process.

FIG. 16 is a diagram showing an example for recording the even MCB line data in the buffer memory using a 180 degree rotation encoding process. The video data of the first line (E1) of even MCB line data is recorded in the second area 30*b*, in a zigzag type in the direction of an arrow 1604 from the right side of bottom 1602 to the left side of top 1606. Similarly, the video data of the second to eighth (E2~E8) lines of the even MCB line data are recorded in the third area 30*c* in a zigzag type in the direction of an arrow 1614 from the right side 1612 of bottom to the left side 1616 of top. In addition, the video data of the second to eighth (E2-E8) lines are recorded in the seventh to first memory blocks (M7~M1) (e.g., right to left order) of the third area 30*c*, respectively.

The 180 degree rotation encoding can be substantially the same as the above-described non-rotation encoding shown in FIG. 15. The odd MCB line data is recorded in the buffer memory 30. Then, the first line of the MCB is obtained from the first area 30*a*. Similarly, the second to eighth lines of the MCB are obtained from the third area 30*c*. While the obtained lines are used to perform encoding by units of the MCB, the even MCB line data is simultaneously recorded beforehand in the encoded memory space. However, an MCB line data recording direction of the 180 degree rotation encoding is opposite to that of the non-rotation encoding, and thus an encoding direction of the 180 degree rotation encoding is opposite to that of the non-rotation encoding.

Figure 17:
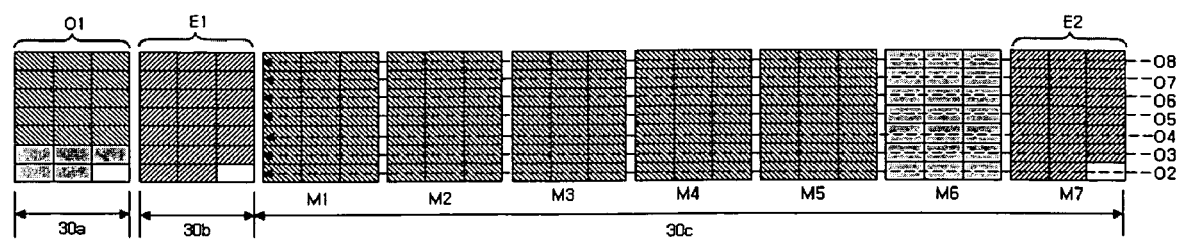
FIG. 17 is a diagram illustrating an example state of a buffer memory passed through 2-cycle encoding after recording odd MCB line data.

FIG. 17 is a diagram illustrating an example state of the buffer memory passed through 2-cycle encoding after recording the odd MCB line data. The video encoder 40 combines the video data recorded in the seventh line of the first area 30*a* (as shown in FIG. 15) and the video data recorded in the seventh memory block (M7) of the third area (30*c*) to form the MCB and perform encoding. While forming the MCB and performing the encoding, the memory controller 20 records the first line (E1) of the even MCB line data in the second area 30*b*. Also, the video encoder 40 combines the video data recorded in the sixth line of the first area 30*a* (as shown in FIG. 15) and the video data recorded in the sixth memory block (M6) of the third area (30*c*) to form the MCB and perform the encoding. While forming the MCB and performing the encoding, the memory controller 20 records the video data of the second line (E2) of the even MCB line data in the encoding-completed seventh memory block (M7) of the third area (30*c*). Theses processes for encoding and recording the video data are repeated until encoding of the odd MCB line data is completed.

Figure 18:
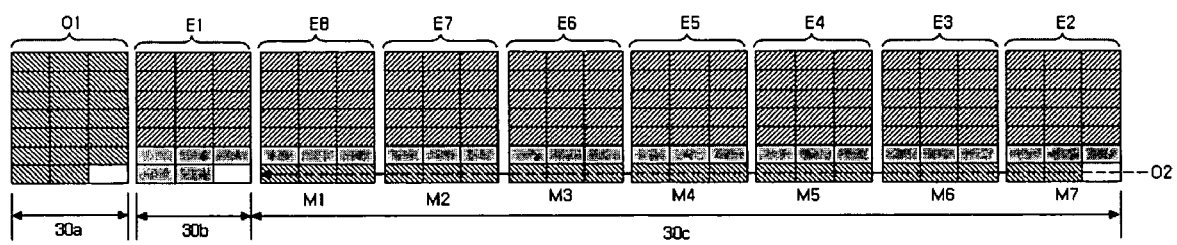
FIG. 18 is a diagram illustrating an example state of a buffer memory passed through 2-cycle encoding after recording even MCB line data.

FIG. 18 is a diagram illustrating an example state of the buffer memory passed through 2-cycle encoding after recording the even MCB line data. The video encoder 40 combines the video data recorded in the seventh line of the second area 30*b* (as shown in FIG. 16) and the video data recorded in the seventh line of the third area (30*c*) to form the MCB and perform encoding. While forming the MCB and performing the encoding, the memory controller 20 records the video data of the first line (O1) of the odd MCB line data in the first area 30*a*. In addition, the video encoder 40 combines the video data recorded in the sixth line of the second area 30*b* (as shown in FIG. 16) and the video data recorded in the sixth line of the third area (30*c*) to form the MCB and perform encoding. While forming the MCB and performing the encoding, the memory controller 20 records the video data of the second line (O2) of the odd MCB line data in the encoding-completed seventh line of the third area (30*c*). Theses processes for encoding and recording the video data are repeated until encoding of the even MCB line data is completed.

In some implementations, the 180 rotation encoding may be implemented by using different dividing techniques of the buffer memory 30 and/or different recording techniques for the odd MCB line data and the even MCB line data. Such various techniques can be implemented on condition that the video data is recorded in the buffer memory 30 and the recorded video data is simultaneously encoded.

Encoding of the video data using the buffer memory 30 having divisional memory space according to the present specification enables a reduction of the memory capacity compared with the conventional encoding of the video data using some other techniques. For illustrative purposes, among others, only the luminance data and not the chrominance data are included and considered in this specification.

Several examples are provided for illustrative purposes. For example, it is assumed that a horizontal size of video data is 1,600 bytes, a size of MCB is 8×8, and a video encoder is capable of encoding 30 MCBs while one line of the video data is recorded in a buffer memory. A conventional digital video codec may require two buffer memories having 1,600×8 size. Therefore, a capacity of the buffer memory 30 required to encode the video data is 25,600 bytes.

In contrast, the techniques described in the present specification can enable the use of a memory space of a smaller size, e.g., 1,600 bytes, assigned to each of the first area and the second area to achieve the same operation. Also, the horizontal size of the third area is 1,680 byes (30×8×7=1,680). In considering the possible supplementary memory space, a memory space of 11,760 bytes (1,680×7=11,760) is assigned to the third area. Therefore, a capacity of a buffer memory 30 required to encode the video data according to the present specification is 14,960 bytes (1,600+1,600+11,760=14,960). Further, the supplementary memory space of the third area is 560 bytes ([1,680−1,600]×7=560).

In spite of allocating supplementary memory space of 560 bytes, video data encoding according to the present specification can be configured to obtain an effective memory reduction of, e.g., 41.45% compared with some other encoding techniques.

Another example is described (Comparison Example 2). Assume that a horizontal size of video data is 1,024 bytes, a size of MCB is 8×8, and a video encoder is capable of encoding 20 MCBs while one line of the video data is recorded in a buffer memory. A conventional digital video codec may require two buffer memories having 1,024×8 size. Therefore, a capacity of the buffer memory required to encode the video data is 16,384 bytes.

According to the present specification, a memory space of 1,024 bytes is assigned to each of the first area and the second area. In addition, the horizontal size of the third area is selected to be 1,120 (20×8×7=1,120) including the possible supplementary memory space. Thus, a memory space of 7,840 (1,120×7=7,840) bytes is assigned to the third area. The capacity needed for a buffer memory to encode the video data is then 9,888 (1,024+1,024+7,840=9,888) bytes. Also, the supplementary memory space of the third area is 1,120 ([1,120−1,024]×7)=672) bytes.

Thus, even after allocating 672 bytes for the supplementary memory, video data encoding according to the present specification obtains an effective memory reduction of 39.64% compared with the conventional encoding techniques.

A third example is described (Comparison Example 3). Assume that a horizontal size of video data is 1,280, a size of MCB is 8×8, and a video encoder is capable of encoding 24 MCBs while one line of the video data is recorded in a buffer memory. A conventional digital video codec may require two buffer memories having 1,280×8 size. Therefore, a capacity of the buffer memory required to encode the video data is 20,480 bytes for the conventional process.

According to the present specification, a memory space of 1,280 bytes is assigned to each of the first area and the second area. In addition, a horizontal size of the third area is 24×8×7=1,344 including the supplementary memory space. Thus, a memory space of 9,408 (1,344×7=9,408) bytes is assigned to the third area. A capacity of a buffer memory needed to encode the video data is then 11,968 (1,280+1,280+9,408=11,968) bytes. Further, a supplementary memory space of the third area is ([1,344−1,280]×7=448) bytes.

Thus, even when 448 bytes are allocated for the supplementary memory space, video data encoding according to the present specification obtains an effective memory reduction of 41.56% compared with the conventional encoding techniques.

A fourth example is described. (Comparison Example 4). Assume that a horizontal size of video data is 1,600 bytes, a size of MCB is 8×8, and a video encoder is capable of encoding 25 MCBs while one line of the video data is recorded in a buffer memory. A conventional digital video codec may require two buffer memories having 1,600×8 size. Therefore, a capacity of the buffer memory required to encode the video data is 25,600 bytes in the conventional codec.

According to the present specification, a memory space of 1,600 bytes is assigned to each of the first area and the second area. A horizontal size of the third area 30*c* needed to record the even MCB line data is 1400 (25×8×7=1,400) bytes and a horizontal size of the third area 30*c* needed to record the odd MCB line data is 1,600 bytes. Thus, a horizontal size of the third area 30*c* is 1,600 bytes. However, when second to eighth lines of the even MCB line data are recorded in the third area 30*c*, with the number of memory lines for the third area 30*c* set to 7, a size of each memory block is 1,400 bytes (25×8×7=1,400). Thus, a limitation exists in recording the MCB line data of 1,600 size in each memory block. For this reason, a supplementary memory space of 200 size can be assigned to each memory block. The number of memory lines for the third area 30*c* is then increased by one. Therefore, a memory space of 12,600 bytes ((1,600×7)+(200×7)=12,600) can be assigned to the third area 30*c*, and the total capacity of the buffer memory 30 needed to encode the video data is 15,800 (1,600+1,600+12,600=15,800) bytes.

Even when allocating the 1,400 bytes for the supplementary memory space, the video data encoding according to the present specification obtains an effective memory reduction of 38.2% compared with the conventional encoding techniques.

The memory reduction effect described in the comparison example 4 is smaller than the memory reduction effect of the comparison example 1. Thus, it may be desirable to assign enough bytes for the supplementary memory space so that the horizontal size of the third area 30*c* is larger than the horizontal size of the video data. This is assuming the number of memory lines of the third area 30*c* is maintained at 7.

It is possible to exchange the recording type for recording the odd MCB line data in the buffer memory 30 and the type for recording the even MCB line data in the buffer memory 30. For example, the first line of the odd MCB line data may be recorded in the second area 30*b*, and the second to eighth lines of the odd MCB line may be recorded in the third area 30*c* in a zigzag type. Also, the first line of the even MCB line may be recorded in the first area 30*a*, and second to eighth lines of the even MCB line may be recorded in the third area 30*c* in a linear type. For this example, the recording principle for all data is substantially the same as the basic recording principle. While the video data recorded in the buffer memory 30 is encoded, next MCB line data is recorded in the encoding-completed memory space.

The subject matter of the present specification is not limited to a specific designing method as shown in the FIGS. For example, different relative positions between the first area 30*a*, the second area 30*b* and the third area 30*c* of the buffer memory 30 can be implemented. In addition, continuous or discontinuous arrangement of assigned memory blocks in the third area 30*c* can be implemented. Further, the position of the supplementary memory space (A) assigned in the third area 30*c* can be varied.

In addition to implementing a reduction in the buffer memory used, the subject matter according to the present specification can be used to implement a video codec for decoding video data having a larger size than the capacity of a frame memory.

Figure 19:
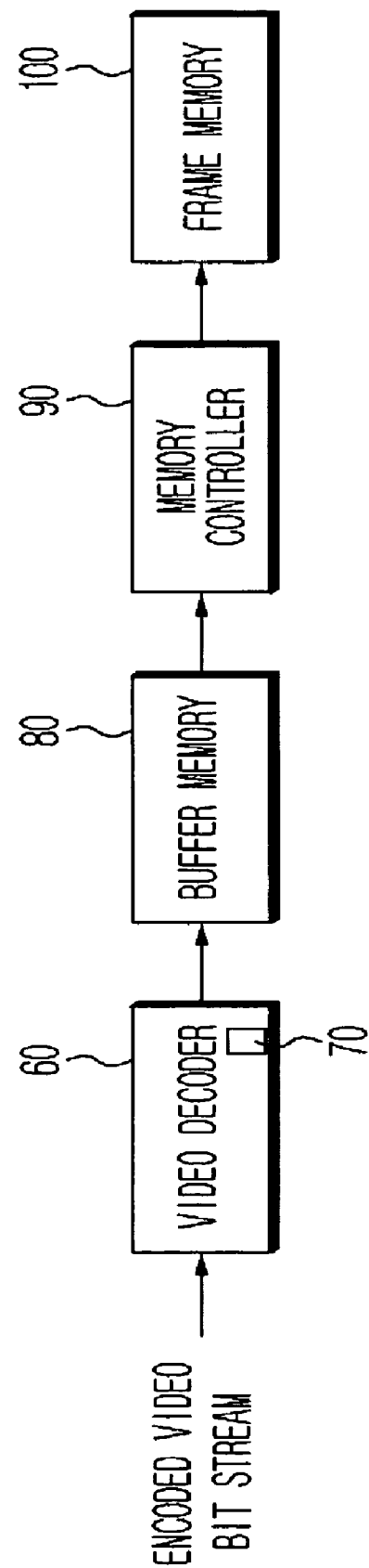
FIG. 19 is a diagram illustrating an example configuration of a video decoding unit of a digital video codec.

FIG. 19 is a block diagram illustrating an example configuration of a video decoding unit of the digital video codec. The video decoding unit includes a video decoder 60, a buffer memory 80, a memory controller 90 and a frame memory 100.

The video decoder 60 is designed to receive the encoded video bit stream. The received encoded video bit stream is decoded by a unit of the MCB (for example, 8×8), and the decoded video data is outputted to the buffer memory 80 connected to the video decoder 60. A memory controller 90 is connected to the buffer memory 90 and the frame memory 100. The memory control is designed to read the video data from the buffer memory 80 and record the read video data in the frame memory 100 when the video data corresponding to a capacity of the buffer memory 80 is accumulated.

A decoding algorithm corresponding to the encoding algorithm used to encode the video data is applied to decode the video data. For example, when detected that the video data is encoded by JPEG (Joint Photographic Experts Group) standard, the video data is decoded by the well-known JPEG standard.

The video decoder 60 can include a scalar unit 70 for scaling the decoded video data by a unit of block having a predetermined size. The scalar 70 downscales the decoded video data by the unit of block having the size corresponding to ½, ¼ or ⅛ of the MCB size applied to encode the video data.

Figure 20:
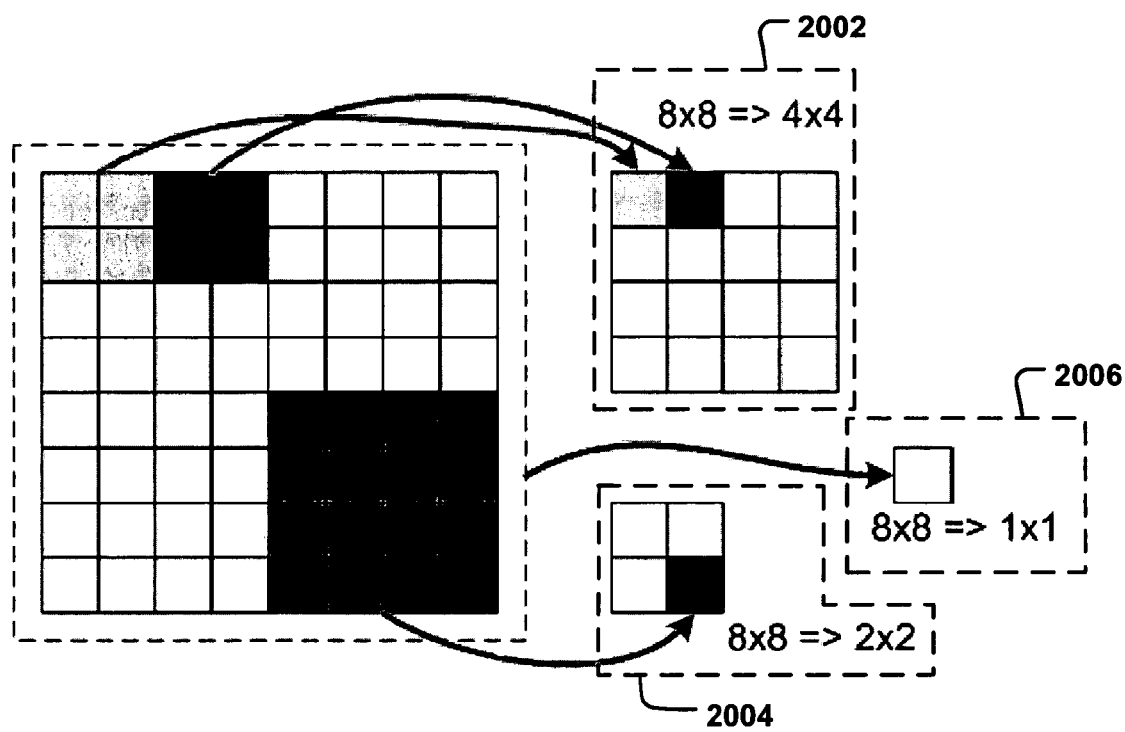
FIG. 20 is a diagram illustrating an example concept of a scalar included in a video decoder to downscale decoded video data by unit of block using various scaling factors.

In particular, when detected that a video data is encoded by a unit of the MCB having 8×8 size, the video decoder 60 decodes the video data by the unit of block having the 8×8 size. Therefore, the decoded video data block has a size of 8×8. In such instance, as shown in FIG. 20, the scalar 70 downscales the decoded video data block in video data blocks having different sizes 2002, 20004 and 2006 (4×4, 2×2 or 1×1 respectively). The video data blocks are outputted to the buffer memory 80.

The scalar 70 can average the pixel data by a unit of block having a size of 8×8, 4×4 or 2×2, and downscale the decoded video data block in video data blocks having a size of 1×1, 2×2 or 4×4. Alternatively, the scalar 70 samples the pixel data at an interval of 8 pixels, 4 pixels or 2 pixels and downscales the decoded video data block in video data blocks having a size of 1×1, 2×2 or 4×4. In some implementations, the downscaling process for a particular video data block may have various other modifications.

A scaling factor of the scalar 70 is determined/selected while considering the horizontal size of the buffer memory 80. The scaling factor is established to provide a horizontal size of the decoded video data that is below a horizontal size of the buffer memory 80. The buffer memory 80 buffers a predetermined number of the MCB line data. Accordingly, the scaling factor can be determined by comparing the horizontal size of the video data with the horizontal size of the buffer memory 80.

It may be desirable to design the horizontal size of the frame memory to be larger than the horizontal size of the buffer memory 80. This may prevent having a recorded video data that is larger than the frame buffer capacity. For example, this may be possible when the horizontal size of the decoded video data is scaled below the horizontal size of the buffer memory 80 by a suitable selection of scaling factors. Selecting the horizontal size of the frame buffer can prevent the size of the video data recorded in the frame memory 100 from exceeding the capacity of the frame memory 100. Because the horizontal size of the frame memory 100 is not smaller than the horizontal size of the buffer memory 80, the horizontal size of the video data becomes smaller than the horizontal size of the frame memory 100. Also, the vertical size of the video data is a parameter dependent on the horizontal size.

When the video data of a frame is recorded in the frame memory 100 through a buffering operation of the buffer memory 80, the decoded video data may be played on a display device using signal processing. For example, the video data (luminance data and chrominance data) recorded in the frame memory 100 is converted into a chrominance signal of red (R), green (G) and blue (B) through RGB (Red, Green, Blue) encoding processing and digital-to-analog (D/A) conversion processing. The chrominance signal is converted into a video signal according to an National Television System Committee (NTSC) method and outputted through a display device.

As described above with respect to FIG. 19, the scalar unit 70 of the video decoder 60 downscales the decoded video data block to enable playback of the video data over the capacity of the frame memory 100. For example, even though the frame memory 100 is designed to play the video data of 3 mega pixels, the scalar 70 downscales the size of the decoded video data block to ½ (8×8→4×4) and buffers the video data block to enable playback of the video data of 12 mega pixels. Therefore, when the video codec having the video decoding unit is implemented in a handheld device with a video recording function and a video playing function, the handheld device is able to play even those high resolution video data having a larger size than the capacity of the frame memory.

Figure 21:
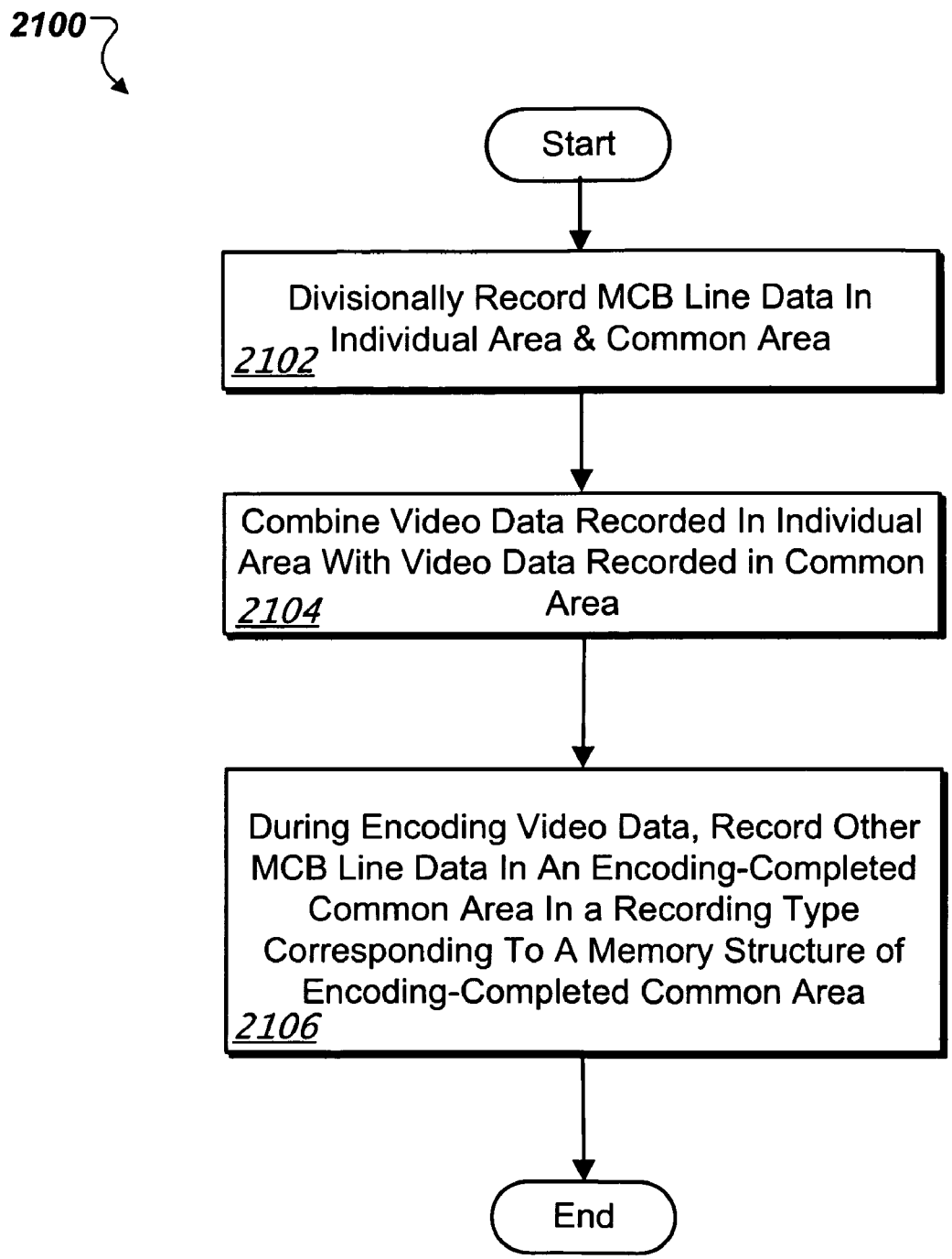
FIG. 21 is a process flow diagram of an example process for controlling a digital video codec.

FIG. 21 shows an example of a process flow 2100 for controlling a digital video codec. As described above with respect to FIGS. 2-20, the process 2100 for controlling a digital video codec performs operations by encoding a video data using a buffer memory having an individual area where different MCB (Minimum Coded Block) line data are individually recorded and a common area where the different MCB line data are commonly recorded. The digital video codec can be controlled by divisionally recording 2102 a MCB line data in the individual area and the common area. Also, the video data recorded in the individual area is combined 2104 with video data recorded in the common area by unit of memory block and the combined video data is encoded. Further, during encoding the video data, other MCB line data is recorded 2106 in an encoding-completed common area in a recording type corresponding to a memory structure of the encoding-completed common area.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A digital video codec, comprising:
   a buffer memory including
   an individual area to individually record different Minimum Coded Block (MCB) line data, and
   a common area to commonly record the different MCB line data; a video encoder connected to the buffer memory to encode video data recorded in the individual area and the common area; and
   a memory controller connected to the buffer memory to divisionally record a MCB line data in the individual area and the common area, and during encoding of the MCB line data, record another MCB line data in an encoding-completed area of the common area in a recording type corresponding to a memory structure of the encoding-completed common area.

2. The digital video codec according to claim 1,
   wherein the individual area includes a first area and a second area to independently record a line of the MCB line data, and
   wherein the memory controller is configured to alternately select the first area and the common area to record the MCB line data and the second area and the common area to record the another MCB line data.

3. The digital video codec according to claim 2, wherein the buffer-memory is configured to record the MCB line data having a size comprising P×N bytes, wherein each of the first and second areas has a memory size capacity to record a video data corresponding to one line of the MCB line data, and wherein the memory controller is configured to record a first line of the MCB line data in the individual storage area and second to Nth lines of the MCB line data in the common storage area.

4. The digital video codec according to claim 3, wherein N is 8.

5. The digital video codec according to claim 1, wherein the memory controller is configured to record the MCB line data in the common storage area in a recording type corresponding to a reading type for encoding the video data recorded in the common storage area.

6. The digital video codec according to claim 5, wherein the MCB line data is recorded in the common storage area using a linear type or a zigzag type.

7. The digital video codes according to claim 6, wherein the memory controller is configured to alternately select the linear type and the zigzag type based on a line order of the MCB line data and record the MCB line data in the common area using the selected type.

8. The digital video codec according to claim 7, wherein the memory controller is configured to select the zigzag type to record each line of the MCB line data by unit of memory block.

9. The digital video codec according to claim 8, when detecting that a number of MCBs processed in an encoding cycle is k, a horizontal size of the unit of memory block is selected as k multiplied by a horizontal size of the MCBs.

10. The digital video codec according to claim 1, wherein the memory controller is configured to alternately select to record the MCB line data in the buffer memory in a first recording type to enable any one line of the MCB line data to be recorded in the individual area, and other lines of the MCB line data to be recorded in the common area in a linear type; and record the another MCB line data in the buffer memory in a second recording type to enable any one line of the anther MCB line data to be recorded in the individual area and other lines of the another MCB line data to be recorded in the common area by unit of memory block in a zigzag type.

11. The digital video codec according to claim 10, wherein the memory controller is configured to record the MCB line data in an independently assigned memory area of the individual area.

12. The digital video codec according to claim 10, wherein the memory controller is configured to record a first line of the MCB line data in the individual area, and the other lines of the MCB line data in the common area.

13. The digital video codec according to claim 1, wherein the memory controller is configured to record the MCB line data in the individual area arranged as a memory block using a zigzag type.

14. The digital video codec according to claim 13, when detected that the number of MCBs processed in an encoding cycle is k, a horizontal size of the memory block is selected to be k times a horizontal size of the MCBs.

15. The digital video codec according to claim 1, wherein the individual area comprises
    a first area; and
    a second area;
    wherein each for the first and second areas includes a memory space to record a video data corresponding to one line of the MCB line data; and
    wherein when detected that the number of MCBs processed in an encoding cycle is k, the memory controller is configured to detect one line of next MCB line data in the second area during an initial encoding cycle of the MCB line data recorded in the first area and the common area, and record one line of the next MCB line data in the first area during an initial encoding cycle of the MCB line data recorded in the second area and the common area.

16. The digital video codec according to claim 1, wherein the memory controller is configured to divide the common area in memory blocks by a number of lines in the MCB line data, and individually records one line of the MCB line data in each memory block.

17. The digital video codec according to claim 16, wherein when detecting that the number of MCBs processed in an encoding cycle is k, a horizontal size of the memory block is selected as a product of k multiplied by a horizontal size of the MCBs.

18. The digital video codec according to claim 1, wherein when detecting that the number of MCBs processed in an encoding cycle is k, during an $n^{th}$ encoding cycle ($n \geq 2$, n is an integral number), the memory controller is configured to record an nth line ($n \geq 2$, n is an integral number) of next MCB line data in the encoded common area in a recording type that is the same as a reading type for encoding.

19. The digital video codec according to claim 1,
    wherein the memory controller is configured to record the MCB line data and the another MCB line data in the common area by alternately using the linear type and the zigzag type based on a numerical order of the MCB line data and the another MCB line data, and wherein the common area comprises a supplementary memory space due to a difference of a recording type of the MCB line data and the another MCB line data.

20. The digital video codec according to claim 19,
    wherein when detecting that a number of MCBs processed in an encoding cycle is k, the supplementary memory space is selected to include a memory space corresponding to a difference between a product of (a horizontal size of the MCBs multiplied by k multiplied by the number of lines of the MCB line data recorded in the common area) and a horizontal size of the MCB line data.

21. The digital video codec according to claim 1,
    wherein the memory controller is configured to
    change a recording start position and a recording progress direction of the MCB line data based on an angle of rotation of the video data, and
    record the first or second MCB line data in the individual area and the common area; and
    wherein the video encoder is configured to change a reading start position and a reading progress direction of the video data for encoding based on an angle of rotation of the video data, and then encodes the video data.

22. The digital video codec according to claim 1, further comprising:
    a video decoder to
    receive an encoded video bit stream,
    decode the video bit stream by unit of MCB,
    downscaling the decoded video bit stream by unit of block, and record the video bit stream in the buffer memory;
    wherein, when recording a video data corresponding to a capacity of the buffer memory, the memory controller is configured to read the video data for playing the video data and accumulatively record the video data in a frame memory.

23. The digital video codec according to claim 22, wherein the video decoder is configured to downscale the decoded video data by unit of memory block to prevent a horizontal size of the video data to be played from exceeding a horizontal size of the buffer memory.

24. The digital video codec according to claim 22,
    wherein the size of the MCB includes N×N bytes; and
    wherein the video decoder is configured to downscale the video data by unit of memory block having a size of $\{N \times (\frac{1}{2})^r\} \times \{N \times (\frac{1}{2})^r\}$ bytes with (r=1, 2, 3).

25. A method for controlling a digital video codec by encoding a video data using a buffer memory having an individual area where different MCB (Minimum Coded Block) line data are individually recorded and a common area where the different MCB line data are commonly recorded, the method comprising:
    divisionally recording, by a memory controller connected to the buffer memory, a MCB line data in the individual area and the common area;
    combining, by a video encoder connected to the buffer memory, video data recorded in the individual area with video data recorded in the common area by unit of memory block and encoding, by a video encoder connected to the buffer memory, the combined video data; and
    during encoding the video data, recording, by the memory other MCB line data in an encoding-completed common area in a recording type corresponding to a memory structure of the encoding-completed common area.

26. The method for controlling a digital video codec according to claim 25, wherein the individual area includes a first area and a second area to independently record the different MCB line data, and wherein the memory controller alternately selects a first combined area that includes the first area and the common area and a second combined area that includes the second area and the common area in a numerical order of the MCB line data; and wherein the memory controller divisionally records the MCB line data in one of the alternately selected first and second combined areas.

27. The method for controlling a digital video codec according to claim 26, wherein a size of the MCB line data is P×N bytes and each of the first and second areas has a memory size capacity to record a video data corresponding to one line of the MCB line data; and wherein the memory controller records a first line of the MCB line data in the first area or the second area, and second to Nth lines of the MCB line data in the common area.

28. The method for controlling a digital video codec according to claim 25, wherein the memory controller records the MCB line data in the common area in a recording type same as a common area reading type for encoding.

29. The method for controlling a digital video codec according to claim 28, wherein the memory controller alternately selects a linear type and a zigzag type in the numerical order of the MCB line data; and wherein the memory controller records the MCB line data in the common area.

30. The method for controlling a digital video codec according to claim 29, wherein the memory controller uses the zigzag type to record each line of the MCB line data by unit of memory block, and wherein when the number of MCBs processed in an encoding cycle is k, the memory controller selects a horizontal size of the unit of memory block of k times the horizontal size of the MCBs.

31. The method for controlling a digital video codec according to claim 25, wherein the memory controller records the MCB line data in the individual area in the form of the unit of memory block by a zigzag type; and wherein when detecting that a number of MCBs processed in an encoding cycle is k, the memory controller selects a horizontal size of the unit of memory block to include a product of k multiplied by a horizontal size of the MCBs.

32. The method for controlling a digital video codec according to claim 25, wherein the individual area includes a first area and a second area, each of the first and second areas including a memory space capacity to record a video data corresponding to one line of the MCB line data; and wherein when detecting that a number of MCBs processed in an encoding cycle is k, the memory controller records one line of next MCB line data in the second area during an initial encoding cycle of the MCB line data recorded in the first area and the common area, and the memory controller records one line of next MCB line data in the first area during an initial encoding cycle of the MCB line data recorded in the second area and the common area.

33. The method for controlling a digital video codec according to claim 25, wherein when the MCB line data is recorded in the common area, the memory controller divides the common area in memory blocks by a number of lines to be recorded in the MCB line data, and individually records one line of the MCB line data in each of the memory blocks; and when detected that a number of MCBs processed in an encoding cycle is k, the memory controller selects a horizontal size of the memory block to include a product of k multiplied by a horizontal size of the MCBs.

34. The method for controlling a digital video codec according to claim 25, wherein when detecting that a number of MCBs processed in an encoding cycle is k, during an nth encoding cycle (n≧2, n is an integral number), the memory controller records an nth line (n≧2, n is an integral number) of next MCB line data in the encoding-completed common area in a recording type same as a reading type used for encoding.

35. The method for controlling a digital video codec according to claim 25, wherein the memory controller changes a recording start position and a recording progress direction of the MCB line data based on an angle of rotation of the video data and records the MCB line data in the individual area and the common area; and wherein the memory controller changes a reading start position and a reading progress direction of the video data for encoding based on an angle of rotation of the video data and encodes the video data.

36. The method for controlling a digital video codec according to claim 25, comprising:

receiving an encoded video bit stream, decoding the video bit stream by unit of MCB, downscaling the decoded video bit stream by unit of memory block, and recording the video bit stream in the buffer memory, by a video decoder; and when a video data corresponding to a capacity of the buffer memory is recorded in the buffer memory, reading the video data for playing the video data and accumulatively recording the video data in a frame memory, by the memory controller.

37. The method for controlling a digital video codec according to claim 36, wherein the video decoder decodes the decoded video data by unit of memory block so that a horizontal size of the video data to be played does not exceed a horizontal size of the buffer memory.

38. The method for controlling a digital video codec according to claim 36, comprising:

wherein a size of the MCB is N×N bytes; and wherein the video decoder downscales the decoded video data by unit of memory block having a size of $\{N\times(1/2)^r\}\times\{N\times(1/2)^r\}$ with (r=1, 2, 3).

39. An apparatus for encoding digital video data comprising:

a buffer memory separated in at least three recordable areas including:

a first area to record video data organized in even Minimum Coded Block (MCB) line data, a second area to record the video data organized in odd MCB line data, and a third area-to record the video data organized in both even and odd MCB line data;

a video encoder connected to the buffer memory to receive and encode the video data recorded in the first, second and third areas; and a memory controller connected to the buffer memory to divisionally record the video data in either (1) the first and third areas or (2) the second and third areas, and during encoding of the video data recorded in the first, second or third area, record another video data arranged in odd or even MCB line data in an encoding-completed area of the third area in a recording type corresponding to a memory structure of the encoding-completed common area.

40. The apparatus of claim 39, further comprising a video decoder to receive and decode an encoded video bit stream, and downscaling the decoded video bit stream by unit of block to prevent a horizontal size of the video data to be played from exceeding a horizontal size of the buffer memory.

\* \* \* \* \*

UNITED STATES PATENT AND TRADEMARK OFFICE
CERTIFICATE OF CORRECTION

| | | |
|---|---|---|
| PATENT NO. | : 8,184,714 B2 | Page 1 of 1 |
| APPLICATION NO. | : 12/079180 | |
| DATED | : May 22, 2012 | |
| INVENTOR(S) | : Shon et al. | |

It is certified that error appears in the above-identified patent and that said Letters Patent is hereby corrected as shown below:

Column 22, Claim 25, Lines 62-65:

Please delete:
"by the memory other MCB line data in an encoding-completed common area in a recording type corresponding to a memory structure of the encoding-completed common area."

and replace with:
"by the memory controller, other MCB line data in an encoding-completed common area in a recording type corresponding to a memory structure of the encoding-completed common area."

Signed and Sealed this
Tenth Day of July, 2012

David J. Kappos
*Director of the United States Patent and Trademark Office*